(12) United States Patent
Miyauchi et al.

(10) Patent No.: US 8,115,867 B2
(45) Date of Patent: Feb. 14, 2012

(54) IMAGE PROCESSING DEVICE

(75) Inventors: Shingo Miyauchi, Osaka (JP); Takao Hasegawa, Hyogo (JP); Yutaka Nio, Osaka (JP)

(73) Assignee: Panasonic Corporation, Osaka (JP)

( * ) Notice: Subject to any disclaimer, the term of this patent is extended or adjusted under 35 U.S.C. 154(b) by 1126 days.

(21) Appl. No.: 11/863,673

(22) Filed: Sep. 28, 2007

(65) Prior Publication Data

US 2008/0084501 A1    Apr. 10, 2008

(30) Foreign Application Priority Data

Oct. 5, 2006   (JP) ................. 2006-274251

(51) Int. Cl.
  H04N 7/01       (2006.01)
  H04N 11/20      (2006.01)
  H04N 7/00       (2011.01)
  H04N 5/50       (2006.01)
  H04N 9/74       (2006.01)
  H04N 7/12       (2006.01)
  H04N 11/02      (2006.01)
  H04N 11/04      (2006.01)
  H04N 3/27       (2006.01)
  H04N 5/445      (2011.01)
  H04N 5/45       (2011.01)

(52) U.S. Cl. ........ 348/452; 348/441; 348/448; 348/465; 348/554; 348/563; 348/565; 348/569; 348/589; 348/600; 375/240.21; 375/240.25; 375/240.26

(58) Field of Classification Search .................. None
See application file for complete search history.

(56) References Cited

U.S. PATENT DOCUMENTS 6,144,412 A * 11/2000 Hirano et al. .................. 348/441
2006/0282867 A1* 12/2006 Mizuhashi et al. ............ 725/105

FOREIGN PATENT DOCUMENTS

| JP | 2-016636   | 4/1990  |
| JP | 4-351185   | 12/1992 |
| JP | 10-112845  | 4/1998  |
| JP | 2004-320305 | 11/2004 |

* cited by examiner

*Primary Examiner* — Joseph P Hirl
*Assistant Examiner* — Mary A Kay
(74) *Attorney, Agent, or Firm* — Hamre, Schumann, Mueller & Larson, P.C.

(57) ABSTRACT

The present invention provides an image processing device that converts an interlace image signal into a progressive signal so as not to cause degradation of image quality in edge parts of letters or the like, when performing an IP conversion with respect to an image that is mixed with an OSD such as a caption and a telop. The image processing device includes: an OSD mix part that mixes an on-screen display with an input interlace image signal; a motion detecting part that detects a motion by comparing pixel data between different fields; and an interpolation pixel generating part that generates a new pixel between lines of the interlace image signal by interpolating calculation with an interpolation method that depends on an OSD mix ratio of the OSD mix part and a result of the motion detection by the motion detecting part.

4 Claims, 3 Drawing Sheets

IMAGE PROCESSING DEVICE

BACKGROUND OF THE INVENTION

1. Field of the Invention

The present invention relates to an image processing device that converts an interlace image signal into a progressive signal, and particularly relates to an image processing device that can perform scanning-line interpolation for obtaining high image quality, with respect to an image that is mixed with an on-screen display such as a caption and a telop.

2. Description of Related Art

Currently existing image signal systems are classified roughly into interlace signal systems that are based on interlace scanning and progressive signal systems that are based on progressive scanning. The interlace scanning is a system that performs scanning with respect to alternate scanning lines among a total of 525 or 1125 scanning lines that constitute one screen of an image. In this system, one display screen (1 frame) is generated by performing the interlace scanning twice, and one frame is constituted of two scanning screens (first and second fields) whose scanning lines are alternate to each other. Whereas, the progressive scanning is a system of scanning with respect to scanning lines one by one sequentially.

Since a conventional image display device reproduces an interlace signal that is transmitted from a broadcast station directly by using a receiver and displays it, the roughness of a displayed picture image that is resulted from the scanning line structure with the alternate lines, line flicker disturbance (flickering of the picture image) and the like occur, thereby causing degradation of the image quality. In order to suppress this degradation of the image quality, it is effective to perform the scanning line interpolation with respect to the transmitted signal on the receiver side, convert it into a progressive signal and then display it. This conversion and display method is called an interlace-progressive conversion (IP conversion) system.

There are various methods for this IP conversion, and in particular, in order to improve the image quality of a displayed picture image, a motion adaptive IP conversion method often has been used recently, which detects a motion of a picture image based on a difference of pixel data between fields, and interpolates a signal by an intra-field interpolation system in the case of a moving picture, or interpolates a signal by an inter-field interpolation system in the case of a still picture, thereby generating line data.

This method adaptively selects or mixes moving picture interpolation data that is obtained by the interpolation from a picture image in a field for generating the line data, and still picture interpolation data that is obtained by the interpolation from picture images of fields located before and after the field for generating a line, thereby generating picture image data of the new line. Moreover, a method has been proposed conventionally, in which, when a ratio of this mixture is determined, a mixture ratio of the moving picture interpolation data is increased if a motion vector is large, and a mixture ratio of the still picture interpolation data is increased if the motion vector is small, according to such a magnitude of the motion vector of the picture image that is detected based on the difference of the pixel data between the fields in a region except for a region of displaying a specific pattern such as a vertical stripe and a horizontal stripe (see, for example, JP 10(1998)-112845 A).

However, in the above-described conventional method, when performing the IP conversion with respect to an image that is mixed with an on-screen display (hereinafter, called an OSD) such as, for example, a caption and a telop, in the case where a background of the OSD such as letters is a moving picture, the moving picture data interpolation is performed, so that a flicker or blurring occurs in edge parts of the letters due to the intra-field interpolation. Since the parts of the letters on the OSD have a vertical frequency component that is higher than that of the image of the background, if a flicker occurs, it becomes very apparent, which leads to the degradation of the image quality.

As a method for solving such a problem, there is a method for mixing, with respect to the image after the IP conversion, an OSD that is separately subjected to resolution conversion so as to be in conformity with the progressive. However, such a method requires a circuit for performing the resolution conversion with respect to the OSD separately. In order to perform vertical resolution conversion for obtaining the high quality, a large capacity of a line memory is required, so that it is disadvantageous with respect to cost.

SUMMARY OF THE INVENTION

Therefore, with the foregoing in mind, it is an object of the present invention to provide an image processing device that does not cause the degradation of the image quality in edge parts of letters or the like, when performing the IP conversion with respect to an image that is mixed with an OSD such as a caption and a telop.

In order to attain the above-mentioned object, the image processing device of the present invention is an image processing device that converts an interlace image signal into a progressive signal, including: an OSD mix part that mixes an on-screen display with the input interlace image signal; a motion detecting part that detects a motion by comparing pixel data between different fields; and an interpolation pixel generating part that generates a new pixel between lines of the interlace image signal by interpolating calculation with an interpolation method that depends on an OSD mix ratio of the OSD mix part and a result of the motion detection by the motion detecting part.

According to the above-described image processing device, except for the moving picture information of the input image signal, the inter-field interpolation is applied according to the OSD mix ratio, when generating an interpolation pixel at the time of the IP conversion, so that, even if a picture image is mixed with the OSD display with the moving picture as a background, the image quality of the displayed picture image can be prevented from the degradation that results from flickers of the letters or the like.

DETAILED DESCRIPTION OF THE INVENTION

An image processing device according to one embodiment of the present invention is an image processing device that converts an interlace image signal into a progressive signal, including: an OSD mix part that mixes an on-screen display with the input interlace image signal; a motion detecting part that detects a motion by comparing pixel data between different fields; and an interpolation pixel generating part that generates a new pixel between lines of the interlace image signal by interpolating calculation with an interpolation method that depends on an OSD mix ratio of the OSD mix part and a result of the motion detection by the motion detecting part.

In the image processing device with the above-described structure, it is preferable that the interpolation pixel generating part includes: an intra-field interpolating part that generates a pixel of an interpolation line from pixel data in a field; an inter-field interpolating part that generates a pixel of an interpolation line from pixel data between a plurality of fields located before and after the field; and an interpolation data selecting part that mixes interpolation data from the intra-field interpolating part and interpolation data from the inter-field interpolating part at a predetermined ratio. According to this preferred structure, it is possible to suppress the occurrence of flickers generated in an OSD display part that is displayed being overlapped with a moving picture when performing the line interpolation with the interpolation pixel generated by the inter-field interpolating part. Incidentally, the interpolation data selecting part can determine the predetermined ratio based on, for example, a motion judgment degree that is detected by the motion detecting part and the OSD mix ratio.

Moreover, in the image processing device with the above-described structure, it is preferable that the interpolation pixel generating part includes: an intra-field interpolating part that generates a pixel of an interpolation line from pixel data in a field; an inter-field interpolating part that generates a pixel of an interpolation line from pixel data between a plurality of fields located before and after the field; and an interpolation data selecting part that selects either of interpolation data from the intra-field interpolating part and interpolation data from the inter-field interpolating part. According to this preferred structure, the flickers on the OSD display can be prevented by a simpler circuit structure. Incidentally, the interpolation data selecting part can determine, for example, whether to select the interpolation data from the intra-field interpolating part or the interpolation data from the inter-field interpolating part, based on the OSD mix ratio.

Specific embodiments of the image processing device of the present invention will be described below with reference to the drawings.

(Embodiment 1)

Figure 1:
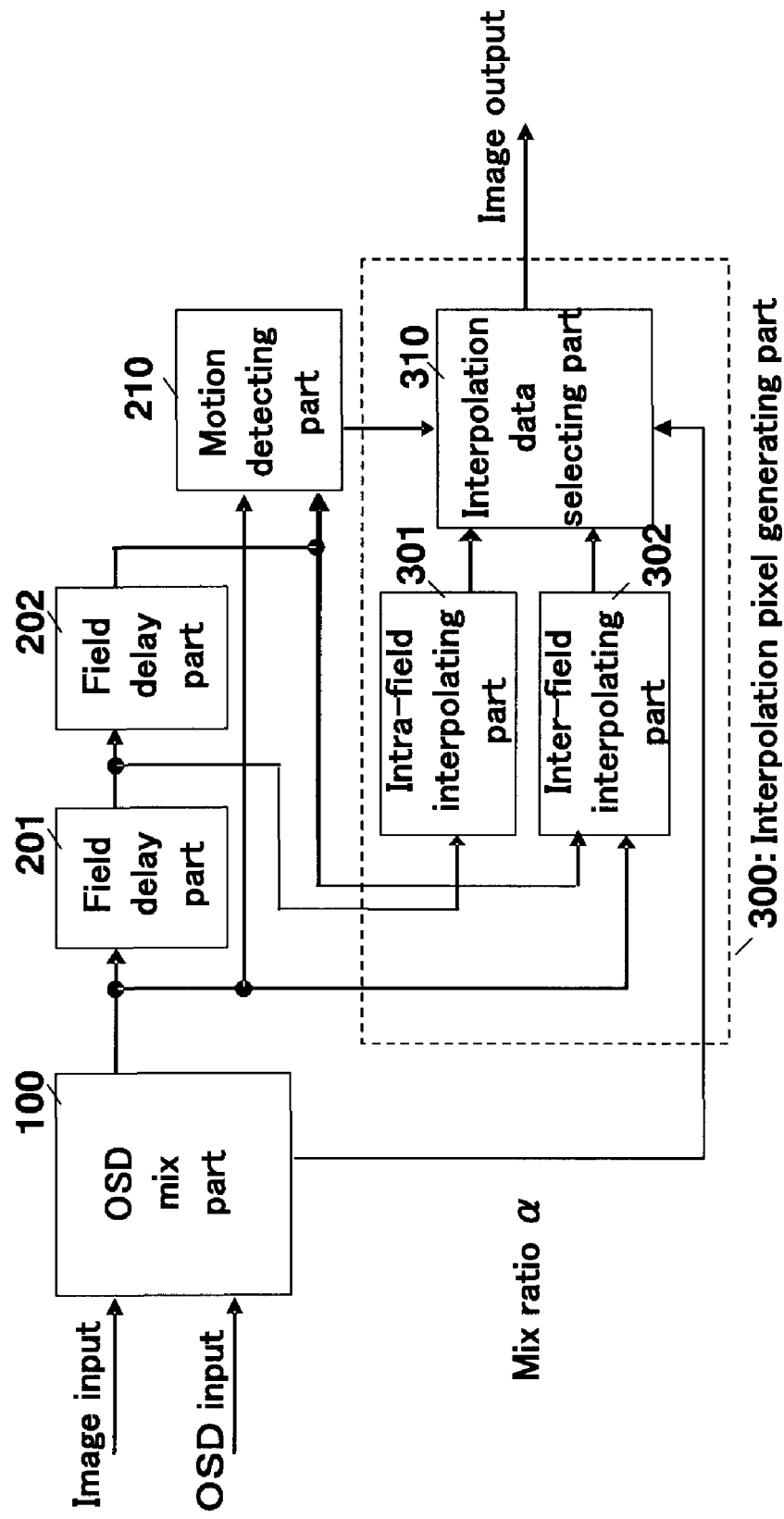
FIG. 1 is a block diagram showing a structure of an image processing device according to Embodiment 1 of the present invention.

FIG. 1 is a block diagram showing a structure of an image processing device according to Embodiment 1 of the present invention.

As shown in FIG. 1, the image processing device of Embodiment 1 is provided with an OSD mix part 100, a field delay part 201, a field delay part 202, a motion detecting part 210 and an interpolation pixel generating part 300.

The OSD mix part 100 mixes an image input that is an interlace image signal and an OSD input at a mix ratio α. Here, the mix ratio α denotes a degree of the OSD input in an output image of a certain pixel, which is represented as:

output image=α×OSD input+(1−α)×input image
(0≦α≦1).

The image signal (0F: field) that is output from the OSD mix part 100 is delayed by one field (1F) by the field delay part 201, and is delayed further by an additional one field (2F) by the field delay part 202. The motion detecting part 210 compares the image signal in the 0F that is an output from the OSD mix part 100, with an output from the field delay part 202 that is delayed by two fields, thereby obtaining an absolute value (frame difference) of a brightness difference of each pixel between the frames. The motion detecting part 210 further obtains a motion judgment degree M from this frame difference. Here, it should be noted that a value of M satisfies $0 \leq M \leq 1$, and as the value of M is closer to 1, the degree as a moving picture is larger.

The interpolation pixel generating part 300 is constituted of an intra-field interpolating part 301, an inter-field interpolating part 302 and an interpolation data selecting part 310. Here, data as an output of the field delay part 201 that is delayed by one field is input into the intra-field interpolating part 301. The intra-field interpolating part 301 delays the input field image (1F) by each line, and performs interpolation by using the delayed line data, thereby generating a new pixel (Pm) between the lines. Thereby, the pixel data of the line necessary for the progressive image signal can be generated by an intra-field interpolation method suitable for moving pictures, that is, only from data in the same field. Whereas, into the inter-field interpolating part 302, the image signal (0F) as the output from the OSD mix part 100 that is not delayed by any field, and the field picture image (2F) from the second field delay part 202 that is delayed by two fields are input. The inter-field interpolating part 302 generates a new pixel (Ps) between the lines by the interpolation using the picture image data that is deviated by two fields. Thereby, the inter-field interpolation that is suitable for moving pictures is performed. That is, the pixel data of the line necessary for the progressive image signal can be generated from the data between the different fields that are adjacent in time.

Figure 2:
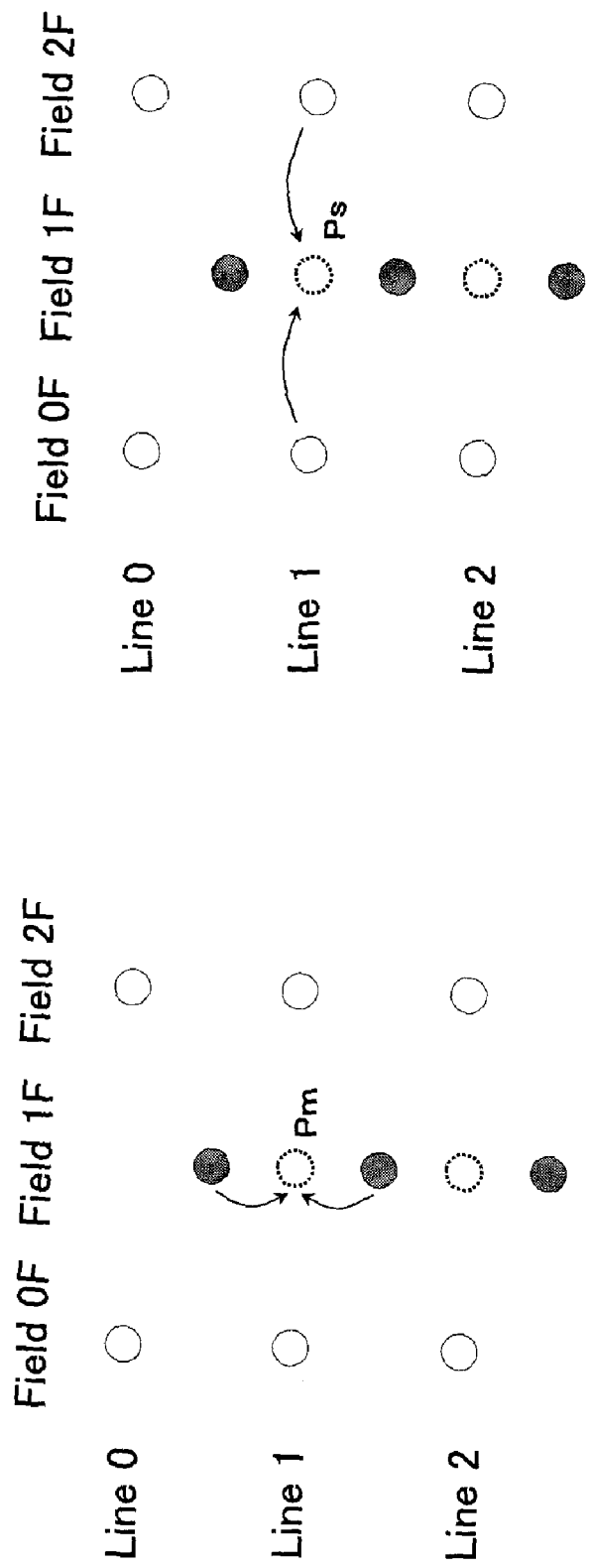
FIG. 2A is an image view showing pixel generation by intra-field interpolation.
FIG. 2B is an image view showing pixel generation by inter-field interpolation.

In addition, FIGS. 2A and 2B show a difference of the generation of the pixel data by the intra-field interpolation method and the inter-field interpolation method, with images. In the intra-field interpolation shown by FIG. 2A, each of pixels Pm in lines 1 and 2 in the field 1F shown in the figure is generated from image data in two lines that respectively are located above and below the pixel Pm in the same field. Thus, the generated pixel data hardly cause a time lag, so that appropriate pixel interpolation can be performed when displaying a moving picture. Whereas, in the inter-field interpolation shown by FIG. 2B, pixels Ps in the lines 1 and 2 in the field 1F are generated from pixel data in the two fields (0F, 2F) that respectively are located before and after the field 1F. In the case of the inter-field interpolation, since the change of display pixel information in the pixel is small, flickers or the like hardly occur. That is, the inter-field interpolation is a method for interpolating a pixel that is appropriate in the case where the change of the pixel data with time has much allowance, which accordingly is suitable for moving pictures.

Next, the interpolation data selecting part 310 of the interpolation pixel generating part 300 mixes the interpolation pixel Pm that is suitable for moving pictures to be input from the intra-field interpolating part 301, and the interpolation pixel Ps that is suitable for still pictures to be input from the inter-field interpolating part 302 at a predetermined mixture ratio Rm, and outputs an output interpolation pixel Po. At this time, Po can be represented by a formula below:

$$Po = Rm \times Pm + (1-Rm) \times Ps$$

where, Rm has a value that satisfies $0 \leq Rm \leq 1$.

In the present embodiment, this mixture ratio Rm is obtained from the motion judgment degree M of the pixel and the OSD mix ratio α, and is represented by a formula: $Rm = M \times (1-\alpha)$ here.

According to the above-described method, the value of α becomes 0.5 in a region that is mixed with, for example, a semitransparent OSD, that is, in a pixel whose ratio between an original image input and an OSD input is 1:1. Thereby, even if a background image is a moving picture (in the case where the value of M is close to 1), the value of Rm is decreased by half, the interpolation is performed closely to that for a still picture (inter-field interpolation). Thus, the degradation of the image quality such as flickers or the like can be prevented.

On the other hand, in the case where the degree of the OSD input is low, that is, in the case where a transparency of the OSD is high enough to enable the clearer recognition of the input picture image that is mixed, the value of α is close to 0, so that the mixture ratio Rm is controlled by M. Thereby, in the case where the background is a moving picture and the value of M is close to 1, the picture image is interpolated closely to the intra-field interpolation that is suitable for moving pictures. Accordingly, it is possible to avoid the degradation of the image quality of the displayed picture image, such as the occurrence of apparent double images of the background moving picture, which is caused when using the interpolation method that is not suitable for interpolating a moving picture.

Figure 3:
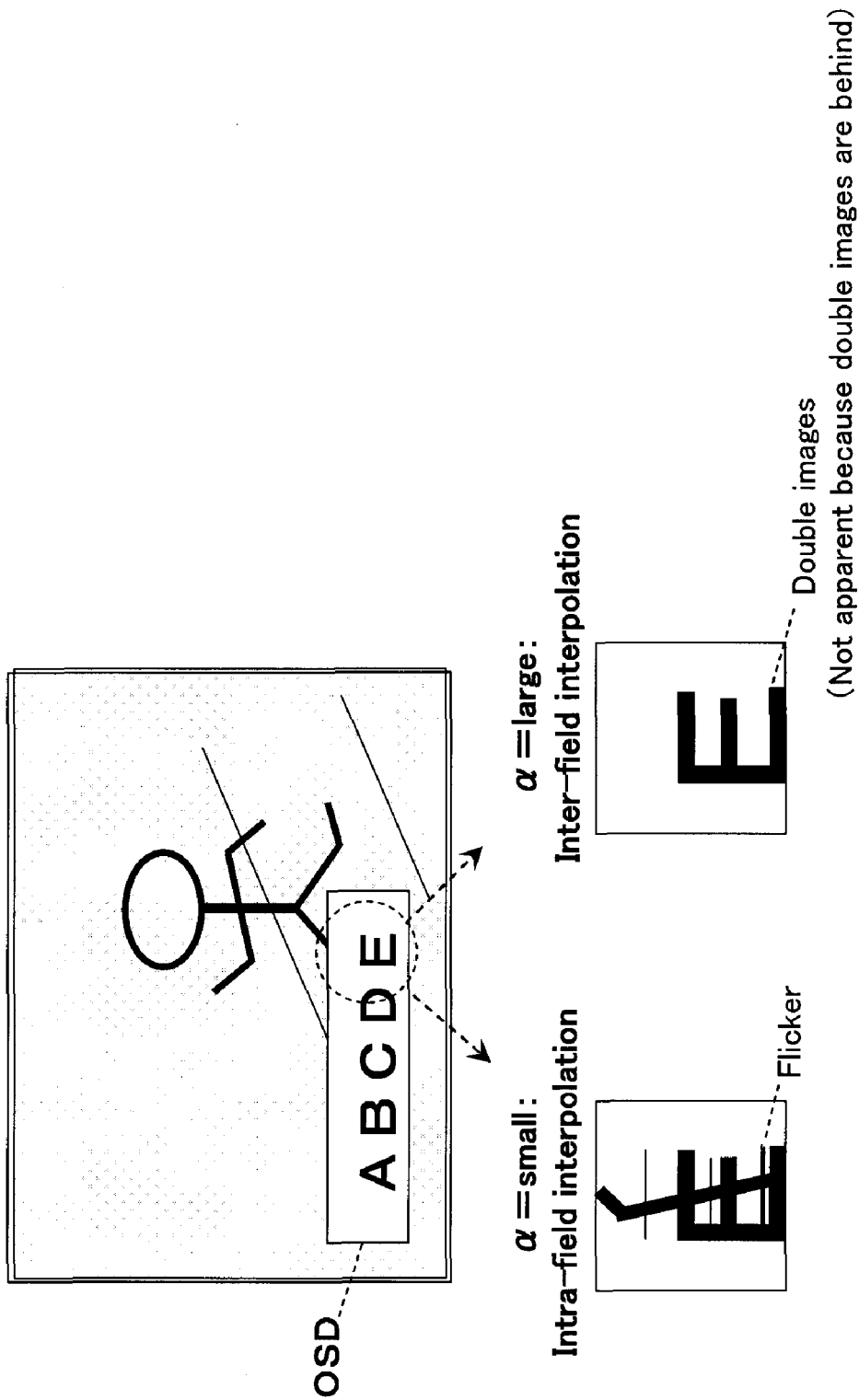
FIG. 3 is an image view showing a picture image that is subjected to IP conversion by an image processing device according to one embodiment of the present invention.

Effects of the interpolation of the picture image by the image processing device of the present invention will be described, by using the picture image of the IP conversion picture image shown in FIG. 3. In the present example of the picture image, an OSD (a semitransparent rectangular-shaped region including letters of A, B, C, D and E) is mixed on a moving object (man-shaped object). Here, in the case where a transparency of the rectangle is high (α is small) or an interpolation function of the present invention is OFF, since a region around the letters that is overlapped with the moving object becomes a moving region, and an interpolation line is generated by the intra-field interpolation, boundaries of the letters are blurred in the vertical direction, thereby causing flickers at the time of reproduction. On the other hand, in the case where the transparency of the rectangle is low (α is large), since the interpolation line is generated by the inter-field interpolation, the boundaries of the letters are sharp. At this time, although the moving object causes double images (motion blurring), they are hidden behind the OSD and thus are not apparent.

Incidentally, the above-described present embodiment has provided the example of controlling the mixture ratio Rm linearly according to the OSD mix ratio α so as to satisfy the relationship of "Rm=M×(1−α)", but the mixture ratio Rm is not limited to this, and may be varied nonlinearly so as to satisfy a relationship represented by "Rm=f (M, α)". For example, if Rm satisfies a relationship of "Rm=M×(1−α)$^2$", a degree of a decrease of Rm with respect to the mix ratio α becomes higher (Rm is ¼ when α is 0.5), the interpolation is performed more closely to that for a still picture.

As described above, it depends on the degree of the overlapping of the OSD display in the OSD region, whether the degradation of the image quality of the displayed picture image due to the flickers in the letters in the OSD part that occurs by the intra-field interpolation, or the degradation of the image quality of the displayed picture image due to the double images of the moving picture of the background that occurs by the inter-field interpolation is recognized as the more significant problem. Thus, by optimizing, with respect to α, the function f for controlling the mixture ratio between the pixel information Pm that is generated by the intra-field interpolation and the pixel information Ps that is generated by the inter-field interpolation, the total degradation of the image quality of the displayed picture image can be prevented.

(Embodiment 2)

Next, Embodiment 2 of the image processing device of the present invention will be described.

The present embodiment is distinctive from Embodiment 1, in the point that the present embodiment adopts a structure in which the interpolation data selecting part 310 selects either one of the intra-field interpolation pixel Pm and the inter-field interpolation pixel Ps as the output interpolation pixel Po, and on the other hand, Embodiment 1 defines the mixture ratio of the intra-field interpolation pixel Pm and the inter-field interpolation pixel Ps on the basis of mixing them.

For example, when judging whether the OSD mix ratio α is a predetermined threshold value Ts or larger, and if the OSD mix ratio α is Ts or larger, the pixel Ps generated by the inter-field interpolation that is suitable for still pictures is used as the interpolation pixel. On the other hand, if the OSD mix ratio α is smaller than Ts, the pixel Pm generated by the intra-field interpolation that is suitable for moving pictures is used as the interpolation pixel.

Thereby, the circuit structure that generates the interpolation pixel can be simplified.

The embodiments of the image processing device of the present invention have been described above, and in all of the embodiments, a picture image is displayed by the progressive scanning by using a pixel obtained by the inter-field interpolation that is more suitable for still pictures in the case where the OSD mix ratio is high. Thus, for example, in the case where an object itself on the OSD such as, for example, letters has a motion, this object may be displayed as double images. In such a case, it is preferable to enable the image processing device itself to detect the presence or absence of the motion of the OSD, or provide an instruction about the presence or absence of the motion of the OSD from the outside. Thereby, it is possible to stop the control of the mixture ratio Rm that is related to the mix ratio α of the OSD. As a result, it is possible to avoid excessive use of the pixel mixed by the inter-field interpolation that is more suitable for still pictures, and also avoid the object being displayed as double images. However, in the case where the OSD has a certain opacity or more, that is, the OSD is mixed at a certain rate or higher, the inter-field interpolation basically can be applied with respect to the region.

The image processing device of the present invention has an effect of suppressing the degradation of the image quality in the IP conversion with respect to the image that is mixed with the OSD, and thus can be expected to be incorporated into an image receiving apparatus that receives, for example, digital television broadcasts.

The present invention is useful for providing the image processing device that does not degrade the image quality of edge parts of letters or the like, when performing the IP conversion with respect to an image that is mixed with the OSD.

The present invention has been explained above by way of the specific embodiments, but the scope of the right of the present invention is not limited to the embodiments described above, and it is obvious that a number of other choices, revisions and workshop modification would be possible for the ordinary skilled in the art. Thus, the present invention is intended to embrace all of such other choices, revisions and workshop modification within the spirit of the claims.

What is claimed is:

1. An image processing device that converts an interlace image signal into a progressive signal, comprising:
   an OSD mix part that mixes an on-screen display with the input interlace image signal;
   a motion detecting part that detects a motion by comparing pixel data between different fields; and
   an interpolation pixel generating part comprising:

an intra-field interpolating part that generates a pixel of an interpolation line from pixel data in a field, an inter-field interpolating part that generates a pixel of an interpolation line from pixel data between a plurality of fields located before and after the field, and an interpolation data selecting part that mixes interpolation data from the intra-field interpolating part and interpolation data from the inter-field interpolating part at a predetermined ratio, wherein the interpolation data selecting part determines the predetermined ratio based on a motion judgment degree that is detected by the motion detecting part and the OSD mix ratio;

wherein the interpolation pixel generating part generates a new pixel between lines of the interlace image signal by interpolating a calculation with an interpolation method that depends on an OSD mix ratio of the OSD mix part and a result of the motion detection by the motion detecting part.

2. An image processing device that converts an interlace image signal into a progressive signal, comprising:

an OSD mix part that mixes an on-screen display with the input interlace image signal;

a motion detecting part that detects a motion by comparing pixel data between different fields; and an interpolation pixel generating part comprising:

an intra-field interpolating part that generates a pixel of an interpolation line from pixel data in a field, an inter-field interpolating part that generates a pixel of an interpolation line from pixel data between a plurality of fields located before and after the field, and an interpolation data selecting part that selects either of interpolation data from the intra-field interpolating part and interpolation data from the inter-field interpolating part based on the OSD mix ratio;

wherein the interpolation generating part generates a new pixel between lines of the interlace image signal by interpolating a calculation with an interpolation method that depends on an OSD mix ratio of the OSD mix part and a result of the motion detection by the motion detecting part.

3. An image processing method for converting an interlace image signal into a progressive signal, comprising:

mixing an on-screen display with the input interlace image signal;

detecting a motion by comparing pixel data between different fields;

generating a pixel of an interpolation line from pixel data in a field using an intra-field interpolating part of an image processing device;

generating a pixel of an interpolation line from pixel data between a plurality of fields located before and after the field using an inter-field interpolating part of the image processing device;

determining a predetermined ratio based on a motion judgment degree and an OSD mix ratio; and mixing interpolation data from the intra-field interpolating part and interpolation data from the inter-field interpolating part at the predetermined ratio;

generating a new pixel between lines of the input interlace image signal by interpolating a calculation with an interpolation method that depends on the OSD mix ratio at a time of mixing the on-screen display with the input interlace image signal and a result of the motion detection.

4. An image processing method for converting an interlace image signal into a progressive signal, comprising:

mixing an on-screen display with the input interlace image signal;

detecting a motion by comparing a pixel data between different fields;

generating a pixel of an interpolation line from pixel data in a field using an intra-field interpolating part of an image processing device;

generating a pixel of an interpolation line from pixel data between a plurality of fields located before and after the field using an inter-field interpolating part of the image processing device;

selecting either of interpolation data from the intra-field interpolating part and interpolation data from the inter-field interpolating part based on the OSD mix ratio; and generating a new pixel between lines of the interlace image signal by interpolating a calculation with an interpolation method that depends on an OSD mix ratio of the OSD mix part and a result of the motion detection by the motion detecting part.

* * * * *